(12) United States Patent
Mizoguchi et al.

(10) Patent No.: US 11,079,793 B2
(45) Date of Patent: Aug. 3, 2021

(54) ADHESIVE MEMBER FOR AN ELECTRONIC DEVICE

(71) Applicant: LENOVO (SINGAPORE) PTE. LTD., Singapore (SG)

(72) Inventors: Fumitake Mizoguchi, Kanagawa-ken (JP); Takehito Yamauchi, Kanagawa-ken (JP); Yoshihisa Ishihara, Kanagawa-ken (JP); Keita Ishikawa, Kanagawa-ken (JP)

(73) Assignee: Lenovo (Singapore) PTE LTD, Singapore (SG)

( * ) Notice: Subject to any disclaimer, the term of this patent is extended or adjusted under 35 U.S.C. 154(b) by 558 days.

(21) Appl. No.: 15/387,044

(22) Filed: Dec. 21, 2016

(65) Prior Publication Data

US 2017/0177028 A1 Jun. 22, 2017

(30) Foreign Application Priority Data

Dec. 21, 2015 (JP) .............................. JP2015-248642

(51) Int. Cl.
 *G06F 1/16* (2006.01)
 *G06F 1/20* (2006.01)
 (Continued)

(52) U.S. Cl.
 CPC .............. *G06F 1/1616* (2013.01); *B32B 7/12* (2013.01); *B32B 25/02* (2013.01); *B32B 25/06* (2013.01); *B32B 25/08* (2013.01); *B32B 25/20* (2013.01); *B32B 27/06* (2013.01); *B32B 27/065* (2013.01); *B32B 29/002* (2013.01); *B32B 29/007* (2013.01); *B32B 37/26* (2013.01); *G06F 1/1637* (2013.01); *G06F 1/1698* (2013.01);
 (Continued)

(58) Field of Classification Search
 CPC ...... G06F 1/1616; G06F 1/203; G06F 1/1637; G06F 1/1698; B32B 25/20; B32B 37/26; B32B 7/12; B32B 2307/302; B32B 2383/00; B32B 2405/00; B32B 2250/03; B32B 2037/268; B32B 3/02
 USPC ........................................ 361/679.01–679.61
 See application file for complete search history.

(56) References Cited

U.S. PATENT DOCUMENTS 5,516,581 A * 5/1996 Kreckel ................. A47G 1/175
 428/317.3
6,162,534 A * 12/2000 Hamerski .............. C09J 7/0225
 248/205.3
(Continued)

FOREIGN PATENT DOCUMENTS

CN 1751285 A 3/2006
CN 100414324 C 8/2008
(Continued)

*Primary Examiner* — Jinhee J Lee
*Assistant Examiner* — Sagar Shrestha
(74) *Attorney, Agent, or Firm* — Antony P. Ng; Russell Ng PLLC

(57) ABSTRACT

An adhesive member is disclosed. The adhesive member includes a first release element, a second release element and a body. The body includes a first adhesive surface and a second adhesive surface. The body also includes a first end face and a second end face. The first end face forms an acute angle with the first release element located on the body. The second end face faces the first end face and forms an obtuse angle with the second release element of the body.

10 Claims, 6 Drawing Sheets

LONGITUDINAL DIRECTION

(51) Int. Cl.
    *B32B 29/00*   (2006.01)
    *B32B 27/06*   (2006.01)
    *B32B 25/08*   (2006.01)
    *B32B 25/02*   (2006.01)
    *B32B 25/06*   (2006.01)
    *B32B 7/12*    (2006.01)
    *B32B 25/20*   (2006.01)
    *B32B 37/26*   (2006.01)

(52) U.S. Cl.
    CPC ........ *G06F 1/203* (2013.01); *B32B 2037/268*
            (2013.01); *B32B 2250/03* (2013.01); *B32B
            2250/40* (2013.01); *B32B 2250/44* (2013.01);
            *B32B 2255/10* (2013.01); *B32B 2255/12*
            (2013.01); *B32B 2264/00* (2013.01); *B32B
            2266/12* (2016.11); *B32B 2266/14* (2016.11);
            *B32B 2307/302* (2013.01); *B32B 2307/50*
            (2013.01); *B32B 2307/748* (2013.01); *B32B
            2383/00* (2013.01); *B32B 2405/00* (2013.01)

(56) References Cited

U.S. PATENT DOCUMENTS

| | | | | |
|---|---|---|---|---|
| 6,569,521 B1* | 5/2003 | Sheridan | ..................... | C09J 7/00 248/205.3 |
| 2002/0090509 A1* | 7/2002 | Hsu | ........................... | B44C 1/10 428/355 RA |
| 2006/0108050 A1* | 5/2006 | Satake | ...................... | B32B 3/02 156/101 |
| 2006/0132450 A1* | 6/2006 | Yamada | .................. | G06F 3/041 345/173 |
| 2012/0055700 A1* | 3/2012 | Horiguchi | .............. | C09J 133/02 174/254 |
| 2012/0112236 A1* | 5/2012 | Higuma | ................ | H01L 33/641 257/98 |
| 2013/0214319 A1* | 8/2013 | Lee | ......................... | H01L 33/52 257/99 |
| 2014/0118198 A1* | 5/2014 | Kawashimo | ......... | H01Q 1/2266 343/702 |
| 2014/0355214 A1* | 12/2014 | Tamai | ................ | H05K 7/20409 361/719 |
| 2015/0086743 A1* | 3/2015 | Lee | ........................... | C09J 9/02 428/41.8 |
| 2015/0147510 A1* | 5/2015 | Saito | ...................... | C09J 201/00 428/40.9 |
| 2015/0171504 A1* | 6/2015 | Hotta | .................. | H01Q 1/2266 343/702 |
| 2015/0218425 A1* | 8/2015 | Malinski | .................... | C09J 9/02 428/189 |
| 2015/0299524 A1* | 10/2015 | Nishijima | .............. | C09J 123/22 428/41.3 |
| 2016/0017193 A1* | 1/2016 | Tanaka | .................. | C09J 167/02 428/41.8 |
| 2017/0148857 A1* | 5/2017 | Goto | .................. | H01L 51/5246 |

FOREIGN PATENT DOCUMENTS

| | | |
|---|---|---|
| CN | 102740949 A | 10/2012 |
| CN | 202826604 U | 3/2013 |
| CN | 103857761 A | 6/2014 |
| JP | 48-032660 | 4/1973 |
| JP | 02-130920 | 10/1990 |
| JP | 2002341770 A | 11/2002 |
| JP | 2008-255255 | 10/2008 |
| JP | 2012-077305 | 4/2012 |
| JP | 2012-167255 | 9/2012 |
| JP | 2013-027716 | 2/2013 |
| JP | 2013-067751 | 4/2013 |

\* cited by examiner

ADHESIVE MEMBER FOR AN ELECTRONIC DEVICE

PRIORITY CLAIM

The present application claims benefit of priority under 35 U.S.C. §§ 120, 365 to the previously filed Japanese Patent Application No. JP2015-248642 with a priority date of Dec. 21, 2015, which is incorporated by reference herein.

TECHNICAL FIELD

The present invention relates to electronic devices in general, and in particular to an electronic device having an adhesive member.

BACKGROUND

Electronic devices, such as laptop personal computers (laptop PCs), tablet-type personal computers (tablet-type PCs), smartphones, cell phones, etc., are becoming thinner and lighter. In each of these electronic devices, a camera and an antenna for radio local-area network (LAN) are typically arranged around a liquid crystal display (LCD) within a chassis. Recently, electronic devices that include an antenna having a high transfer speed, such as an antenna based on Wireless Gigabit (WiGig) technology, has also appeared on the market.

An antenna designed for high-speed communication based on WiGig technology tends to generate a large amount of heat. Thus, when such an antenna is being used near and around a LCD, additional measures needed to be made to dissipate heat by providing a thermal rubber, which is also used for a processor, on the surface of the LCD.

Film-shaped release elements (release paper) are provided on, for example, both surfaces of a thermal rubber, and before sticking the thermal rubber onto a surface of an object, the release elements can be removed with a pair of tweezers in order to allow the thermal rubber to be stuck onto the object surface. However, the thermal rubber is a soft material made of, for example, a conductive silicone resin, and both surfaces on which the release elements are to be installed are configured as adhesive faces.

When an operator intends to remove the release element on one surface by anchoring the release member with a pair of tweezers, the thermal rubber can be deformed in a direction that the release element is to be released, and the release element is brought into a disable state and/or it sometimes occurs that the release element that has been provided on the opposite-side surface is unintentionally released, following the occurrence of the thermal rubber deformation. In other words, when the release elements are provided on the both surfaces of the thermal rubber, it is difficult to remove the release element on the intended side (i.e., to control the side that the release paper is to be released).

Consequently, it would be preferably to provide an improved method to remove release elements from the surfaces of a thermal rubber.

SUMMARY

In accordance with an embodiment of the present disclosure, an adhesive member includes a first release element, a second release element and a body. The body includes a first adhesive surface and a second adhesive surface. The body also includes a first end face and a second end face. The first end face forms an acute angle with the first release element located on the body. The second end face faces the first end face and forms an obtuse angle with the second release element of the body.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

I. Configuration of an Electronic Device

Figure 1:
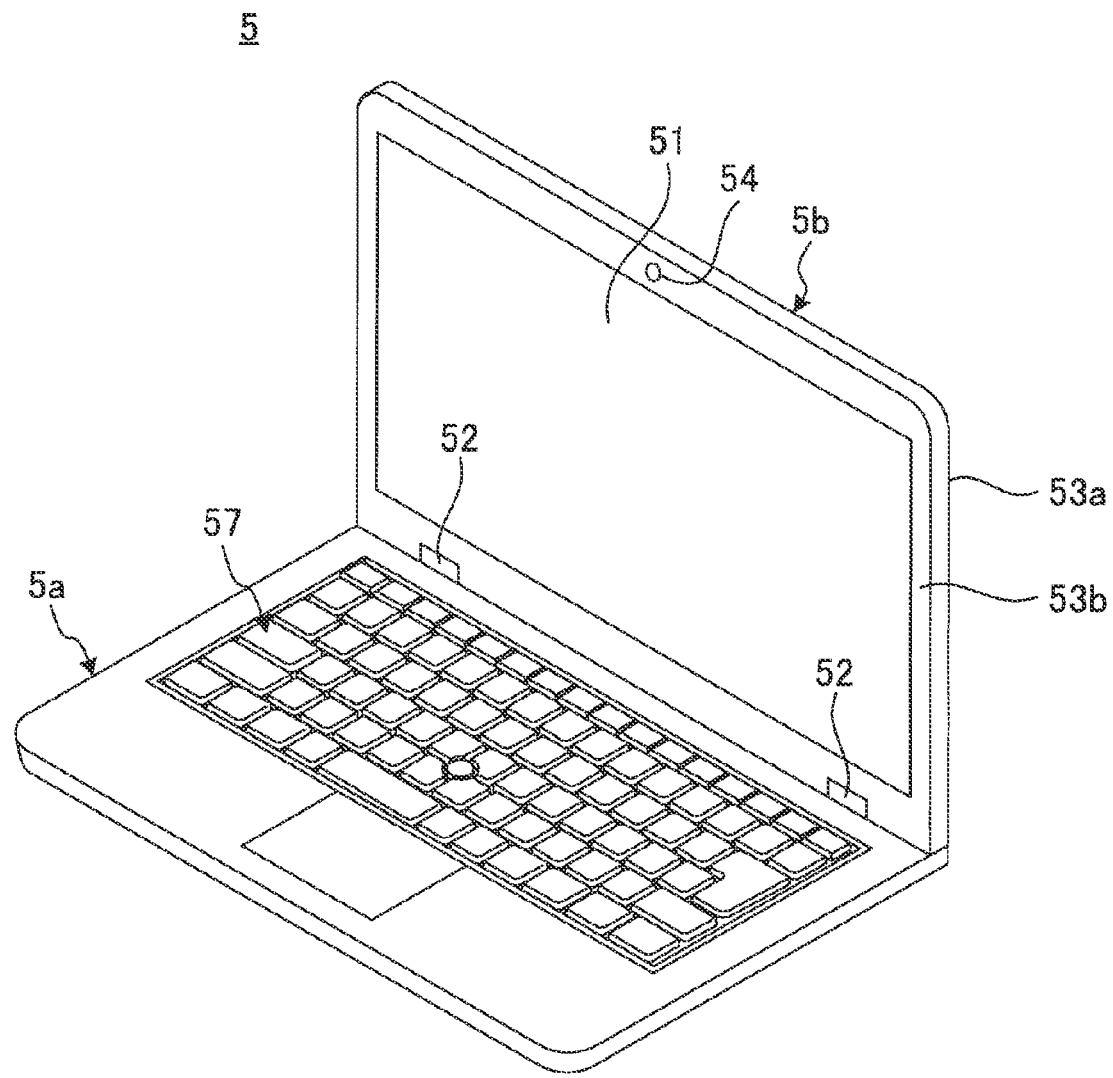
FIG. 1 is a perspective view of an electronic device in which an adhesive member can be incorporated.

FIG. 1 is a perspective view of an electronic device in which an adhesive member has been incorporated. As shown, an electronic device 5 is a clamshell-type laptop PC that includes a device body 5a which includes a keyboard unit 57, a display unit 51 configured by a liquid crystal display and so forth, a rectangular plate-shaped lid body 5b which includes a back surface cover 53a and a front surface cover 53b and so forth and in which the lid body 5b has been coupled to the device body 5a via left and right hinges 52 to be openable and closable.

Figure 2:
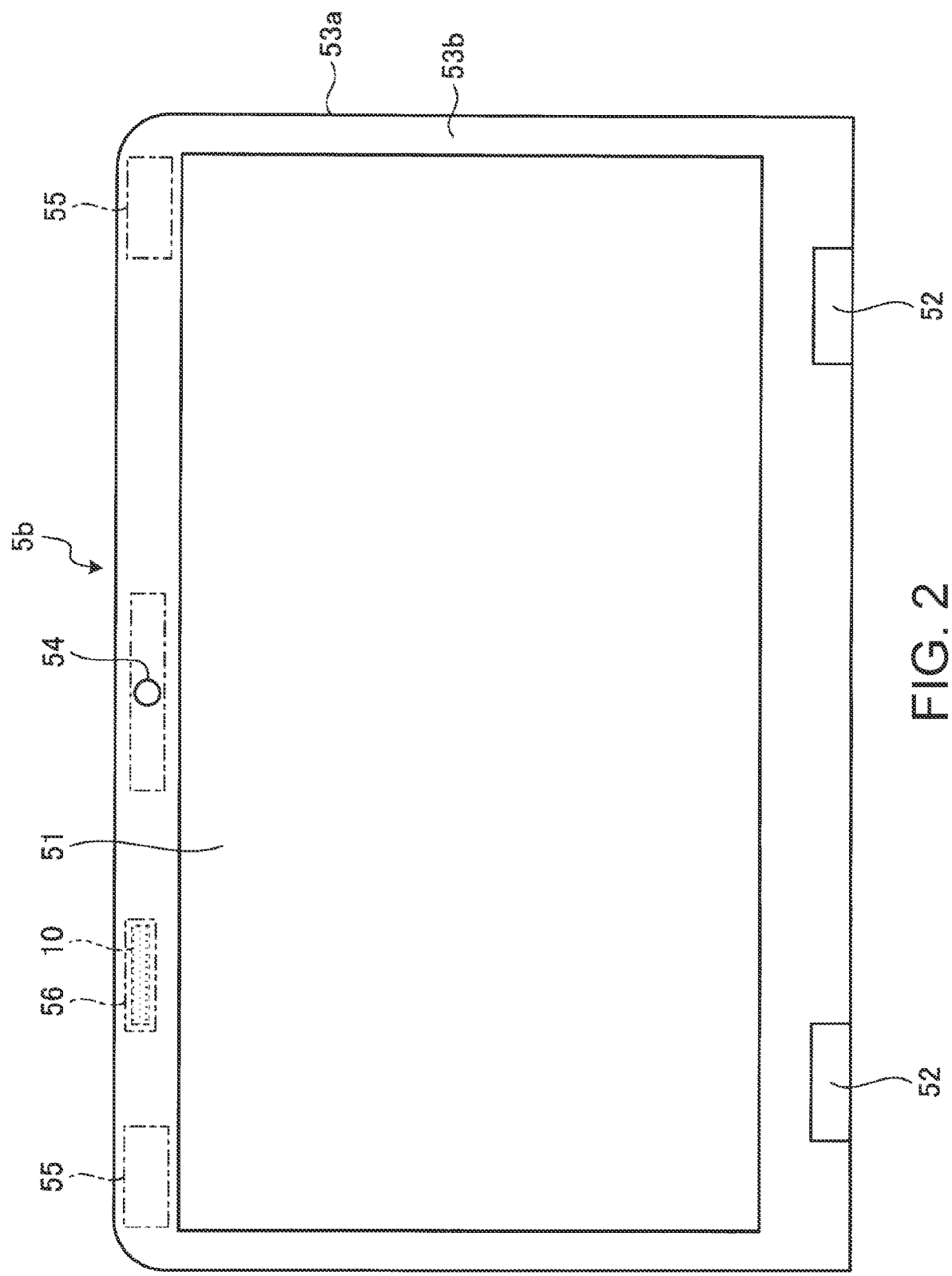
FIG. 2 is a front view of a liquid crystal display of the electronic device from FIG. 1.

In addition, as illustrated in FIG. 2, in the electronic device 5, a camera 54, an antenna for radio LAN 55 and an antenna 56 for Wireless Gigabit (WiGig) technology are arranged around the display unit 51 between the back surface cover 53a and the front surface cover 53b. As described later, thermal rubber for heat radiation is supposed as the material of an adhesive member body 10 of an adhesive member 1, according to one embodiment of the present invention. Then, as illustrated in FIG. 2, the adhesive member body 10 is arranged (stuck) on a surface of the antenna 56 which has been arranged around, for example, the display unit 51 and is used as a heat radiation member.

II. Configuration of an Adhesive Member

Figure 3:
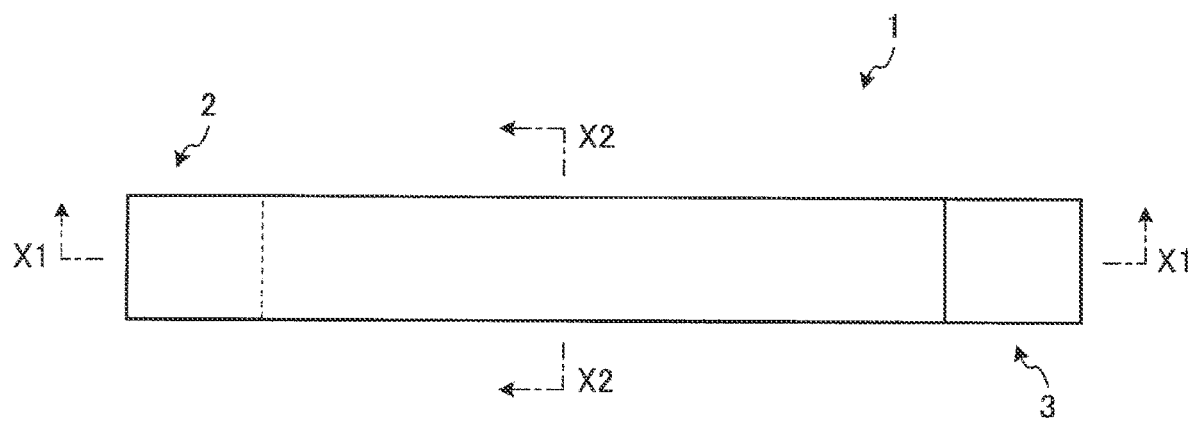
FIG. 3 is a top view of an adhesive member.
Figure 4:
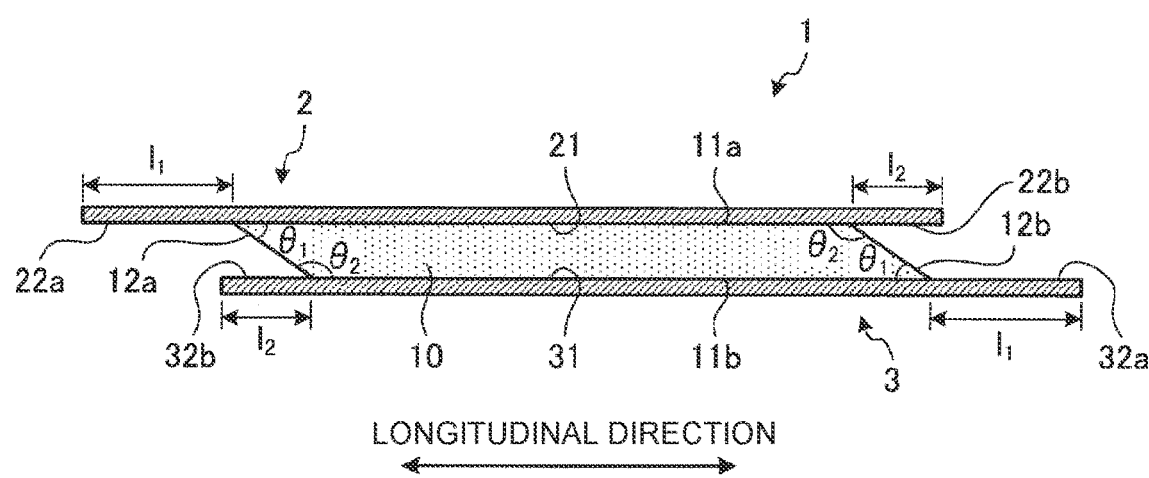
FIG. 4 is a cross-sectional diagram taken along the X1-X1 line of the adhesive member from FIG. 3.
Figure 5:
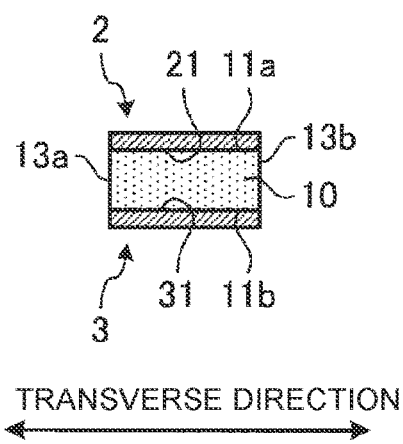
FIG. 5 is a cross-sectional diagram taken along the X2-X2 line of the adhesive member from FIG. 3.

As shown in FIGS. 3-5, the adhesive member 1 includes the adhesive member body 10, a first release element 2, a second release element 3, etc.

The adhesive member body 10 is, for example, a thermal rubber for heat radiation and is made of a conductive silicon resin that conductive fine particles have been mixed with the silicon resin which serves as a base material. As illustrated in FIG. 4, the adhesive member body 10 has adhesive faces 11a and 11b on both surfaces and is formed into a thin sheet shape. Also as illustrated in FIG. 4, in the adhesive member body 10, one section which is taken along the X1-X1 line in FIG. 3 is formed into the shape of a parallelogram, and as illustrated in FIG. 5, another section which is taken along the X2-X2 line in FIG. 3 is formed into the shape of a rectangle.

As illustrated in FIG. 4, two end faces 12a and 12b oriented in a longitudinal direction of the adhesive member body 10 are inclined at angles other than right angles relative to the adhesive faces 11a and 11b of the adhesive member body 10. That is, one end face (a first end face) 12a of the adhesive member body 10 forms one acute angle $\theta_1$ together with one adhesive face 11a of the adhesive member body 10 and forms one obtuse angle $\theta_2$ together with the other adhesive face 11b of the adhesive member body 10. In addition, the other end face (a second end face) 12b of the adhesive member body 10 forms another obtuse angle $\theta_2$ together with one adhesive face 11a of the adhesive member body 10 and forms another acute angle $\theta_1$ together with the other adhesive face 11b of the adhesive member body 10.

Although there is no particular limitation to degrees of the acute angle $\theta_1$ and the obtuse angle $\theta_2$ of the two end faces 12a and 12b oriented in the longitudinal direction of the adhesive member body 10, it is favorable to set the obtuse angle $\theta_2$ to, for example, at least about 100 degrees (set the acute angle $\theta_1$ to not more than about 80 degrees) and it is more favorable to set the obtuse angle $\theta_2$ to about 135 degrees (set the acute angle $\theta_1$ to about 45 degrees). Thereby, it is possible to easily release the first release element 2 and the second release element 3 from the adhesive member body 10 as will be described later. Incidentally, although in the example illustrated in FIG. 4, the acute angle and the obtuse angle on the end face 12a side and the acute angle and the obtuse angle on the end face 12b side are denoted by the same symbols ($\theta_1$ and $\theta_2$), the acute angles and the obtuse angles on the both sides may have mutually different degrees respectively.

As illustrated in FIG. 5, two end faces 13a and 13b oriented in a transverse direction of the adhesive member body 10 are formed at right angles relative to the adhesive faces 11a and 11b of the adhesive member body 10 unlike the above-mentioned end faces 12a and 12b. Incidentally, it is possible to form the adhesive member body 10 by stamping using a Thomson type mold, a wicker basket type mold and so forth. In addition, stamping may be performed while moving, for example, the material which forms the adhesive member body 10 in accordance with movement of the mold in order to incline the end faces 12a and 12b of the adhesive member body 10 as mentioned above.

The first release element 2 and the second release element 3 are installed from the viewpoint of convenience when the operator sticks the adhesive member body 10 onto an internal unit (for example, the antenna 56) of the electronic device 5 and is configured by, for example, a resinous thin release film, resinous release paper and so forth. The first release element 2 and the second release element 3 are respectively arranged on the adhesive face 11a and the adhesive face 11b as illustrated in FIG. 4. In addition, in the first release element 2 and the second release element 3, for example, a mold releasing agent is coated on adhered faces 21 and 31 which respectively correspond to the adhesive faces 11a and 11b.

As illustrated in FIG. 4, the first release element 2 and the second release element 3 are arranged such that the sides that the obtuse angles $\theta_2$ have been formed respectively relative to the end faces 12a and 12b of the adhesive member body 10 project respectively from the end faces 12a and 12b of the adhesive member body 10 in the longitudinal direction of the adhesive member body 10. That is, the first release element 2 has a projection part 22b that the obtuse angle $\theta_2$ side of the end face 12b has projected in the longitudinal direction by a length 12. In addition, the second release element 3 has a projection part 32b that the obtuse angle $\theta_2$ side of the end face 12a has projected in the longitudinal direction by the length 12.

Figure 7:
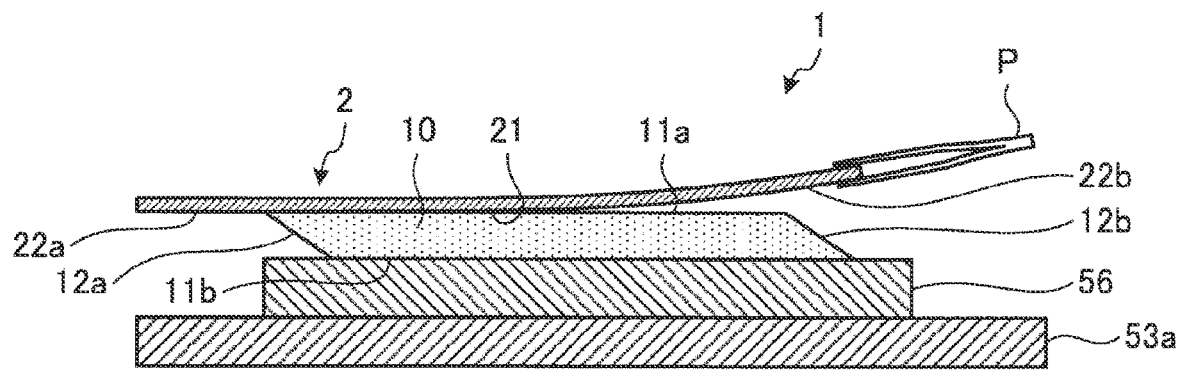
FIG. 7 is a diagram showing a method of releasing a first release element from the adhesive member of FIG. 4.

Owing to provision of such a configuration, the projection part 22b is gripped and force is applied in a direction away from the adhesive face 11a, and thereby it is possible to easily release only the first release element 2 from the adhesive member body 10 without releasing the second release element 3 from the adhesive member body 10 (see later described FIG. 7). In addition, the projection part 32b is gripped and force is applied in a direction away from the adhesive face 11b, and thereby it is possible to easily release only the second release element 3 from the adhesive member body 10 without releasing the first release element 2 from the adhesive member body 10. Incidentally, although in the example in FIG. 4, the length of the projection part 22b and the length of the projection part 32b are designated by the same symbol (12), the lengths of both may be different from each other. In addition, the projection part 22b or the projection part 32b may be provided only on either the first release element 2 or the second release element 3.

As illustrated in FIG. 4, the first release element 2 and the second release element 3 are respectively arranged such that the sides that the acute angles $\theta_1$ have been formed respectively relative to the end faces 12a and 12b of the adhesive member body 10 project respectively from the end faces 12a and 12b of the adhesive member body 10 in the longitudinal direction of the adhesive member body 10. That is, the first release element 2 has a projection part 22a that the acute angle $\theta_1$ side of the end face 12b has projected in the longitudinal direction by a length 11. In addition, the second release element 3 has a projection part 32a that the acute angle $\theta_1$ side of the end face 12a has projected in the longitudinal direction by the length 11.

Owing to provision of such a configuration, the projection part 22a is gripped and force is applied in the direction away from the adhesive face 11a, and thereby it is possible to easily release only the second release element 3 from the adhesive member body 10 without releasing the first release element 2 from the adhesive member body 10 (see later described FIG. 6). In addition, the projection part 32a is gripped and force is applied in the direction away from the adhesive face 11b, and thereby it is possible to easily release only the first release element 2 from the adhesive member body 10 without releasing the second release element 3 from the adhesive member body 10. Incidentally, although in the example in FIG. 4, the length of the projection part 22a and the length of the projection part 32a are designated by the same symbol (11), the lengths of both may be different from each other. In addition, the projection part 22a or the projection part 32a may be provided only on either the first release element 2 or the second release element 3.

The lengths 11 along which the first release element 2 and the second release element 3 project from the sides that the acute angles $\theta_1$ have been formed respectively relative to the end faces 12a and 12b of the adhesive member body 10 are different from the lengths 12 along which the first release element 2 and the second release element 3 projects from the sides that the obtuse angles $\theta_2$ have been formed respectively relative to the end faces 12a and 12b of the adhesive member body 10. That is, the first release element 2 and the second release element 3 are configured that the lengths 11 of the projection parts 22a and 32a become longer than the lengths 12 of the projection parts 22b and 32b.

Owing to provision of such a configuration, it becomes possible to easily discriminate the acute angle $\theta_1$ side from the obtuse angle $\theta_2$ side depending on a difference in length between the projection parts 22a and 32a and the projection parts 22b and 32b when the operator arranges the adhesive member body 10 of the adhesive member 1 on the internal unit of the electronic device 5. Incidentally, although in the example in FIG. 4, the first release element 2 and the second release element 3 are configured such that the lengths 11 of the projection parts 22a and 32a become longer than the lengths 12 of the projection parts 22b and 32b, the first release element 2 and the seconds release element 3 may be configured such that the lengths 11 of the projection parts 22a and 32a become shorter than the lengths 12 of the projection parts 22b and 32b.

In addition, the first release element 2 and the second release element 3 may be configured such that the sides that the acute angles $\theta_1$ have been formed relative to the faces 12a and 12b of the adhesive member body 10 and the sides that the obtuse angles $\theta_2$ have been formed relative to the end faces 12a and 12b of the adhesive member body 10 have mutually different forms. For example, colors, patterns and/or shapes of the end faces and the surfaces of the first release element 2 and the second release element 3 may be made mutually different between the sides that the acute angles $\theta_1$ have been formed and the sides that the obtuse angles $\theta_2$ have been formed. By doing in this way, it becomes possible to easily discriminate the sides that the acute angles $\theta_1$ have been formed from the sides that the obtuse angles $\theta_2$ have been formed in the first release element 2 and the second release element 3 depending on the appearance, the touch and so forth. It is possible to mutually change the forms of the first release element 2 and the second release element 3 in this way regardless of presence/absence of the projection parts 22a, 22b, 32a and 32b.

As illustrated in FIG. 5, the first release element 2 and the second release element 3 do not project from the end faces 13a and 13b of the adhesive member body 10 in the transverse direction of the adhesive member body 10 unlike the case of projection in the above-mentioned longitudinal direction and are configured so as to have the same lengths (widths) as the adhesive member body 10.

Incidentally, after the adhesive member body 10 has been stamped by using, for example, the Thomson type mold, the wicker basket type mold and so forth and molded into the shapes as illustrated in FIG. 4 and FIG. 5, the first release element 2 and the second release element 3 are provided on both of the adhesive faces 11a and 11b respectively.

III. Procedure of Applying an Adhesive Member

A method of applying the adhesive member body 10 of the adhesive member 1 to the antenna 56 that is one of the internal units of the electronic device 5 will be described. In the following, one example that each of the first release element 2 and the second release element 3 that have been provided on the both surfaces of the adhesive member body 10 is released by gripping with a gripping member P (such as a pair of tweezers) and the adhesive member body 10 is stuck on the antenna 56 will be described.

First, the second release element 3 is released from the adhesive member body 10. In this case, as illustrated in FIG. 6, the projection part 22a of the first release element 2 is gripped with the gripping member P and is lifted up in a state (not illustrated) of supporting the second release element 3 with fingers and so forth of the operator. Then, also as illustrated in FIG. 6, the adhesive face 11b of the adhesive member body 10 is gradually separated from the adhered face 31 of the second release element 3 and finally the second release element 3 is released from the adhesive member body 10, in a state where the adhered face 21 of the first release element 2 and the adhesive face 11a of the adhesive member body 10 have been closely stuck together. Then, the adhesive member body 10 which is in a state of being stuck on the first release element 2 is placed on the surface of the antenna 56 and gripping with the gripping member P is released (not shown).

Figure 6:
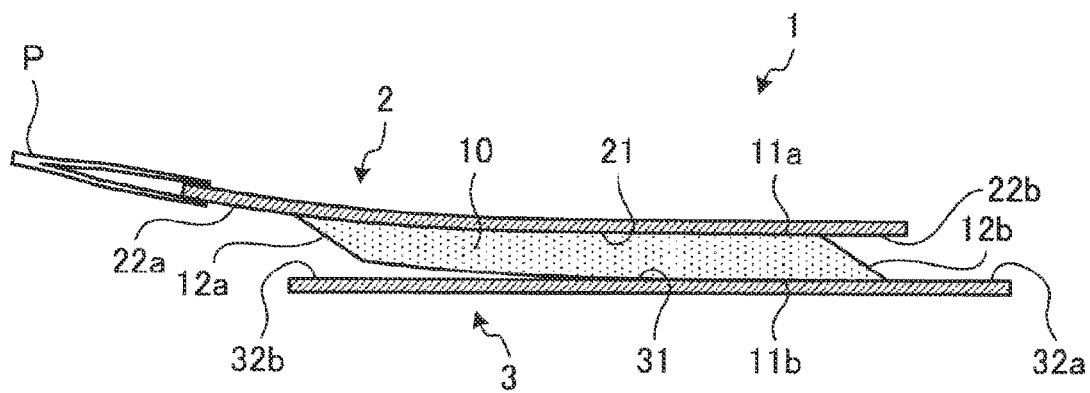
FIG. 6 is a diagram showing a method of releasing a second release element from the adhesive member of FIG. 4.

As described above, in the adhesive member 1 according to the present embodiment, in the projection parts 22a and 22b of the first release element 2, the projection part 22a located on the acute angle $\theta_1$ side of the adhesive member body 10 is gripped and lifted up as illustrated in FIG. 6 in a state where the first release element 2 and the second release element 3 are respectively arranged on the both surfaces of the adhesive member body 10, and thereby it is possible to surely release only the second release element 3 from the adhesive member body 10.

On the other hand, in contrast to the situation illustrated in FIG. 6, when, for example, in the projection parts 22a and 22b of the first release element 2, the projection 22b which is located on the obtuse angle $\theta_2$ side of the adhesive member body 10 has been gripped and lifted up, it is possible to surely release only the first release element 2 from the adhesive member body 10. That is, in the adhesive member 1 according to the present embodiment, it is possible to select the release element (the first release element 2 or the second release element 3) to be released in accordance with the projection part (the projection part 22a or the projection part 22b) to be lifted up. The principle thereof will be described later (see FIG. 9 to FIG. 12).

Then, the first release element 2 is released from the adhesive member body 10. In this case, as illustrated in FIG. 7, the projection part 22b which is located on the opposite side of the projection part 22a which has been gripped in the example illustrated in FIG. 6 is gripped with the gripping member P and lifted up. Then, also as illustrated in FIG. 7, the adhesive face 11a of the adhesive member body 10 and the adhered face 21 of the first release element 2 are gradually separated from each other and finally the first release element 2 is released from the adhesive member body 10, in a state where the adhesive face 11b of the adhesive member body 10 and the surface of the antenna 56 have been stuck together. Thereby, arrangement of the adhesive member body 10 onto the surface of the antenna 56 is completed.

Figure 8:
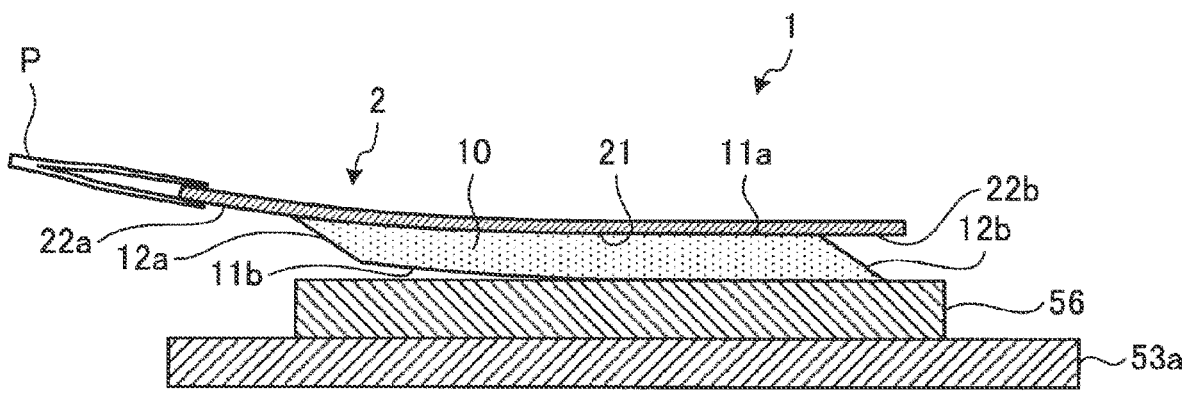
FIG. 8 is a diagram showing a method of applying the adhesive member body on an antenna.

Incidentally, in FIG. 6, for example, in a case where when the adhesive member body 10 which is in a state of being stuck to the first release element 2 has been placed on the surface of the antenna 56, the adhesive member body 10 has been displaced from a position at which the adhesive member body 10 is planned to be placed, the projection part 22a of the first release element 2 is gripped with the gripping member P and is lifted up as illustrated in FIG. 8. Then, also as illustrated in FIG. 8, the adhesive face 11b of the adhesive member body 10 and the surface of the antenna 56 are gradually separated from each other and finally the adhesive member body 10 is released from the surface of the antenna 56, in a state where the adhered face 21 of the first release element 2 and the adhesive face 11a of the adhesive member body 10 have been closely stuck together. Thereby, it becomes possible to stick the adhesive member body 10 again to the position at which the adhesive member body 10 is planned to be placed on the surface of the antenna 56.

IV. The Principle of Releasing the Release Elements

The principle of releasing the first release element 2 and the second release element 3 will be described by comparing the prior art with the present invention. Incidentally, in FIGS. 9-12 that will be referred in the following description, only a one-half part of each of the adhesive member 1 and an adhesive member 101 is illustrated and illustration of the other-half parts thereof is omitted.

Figure 9:
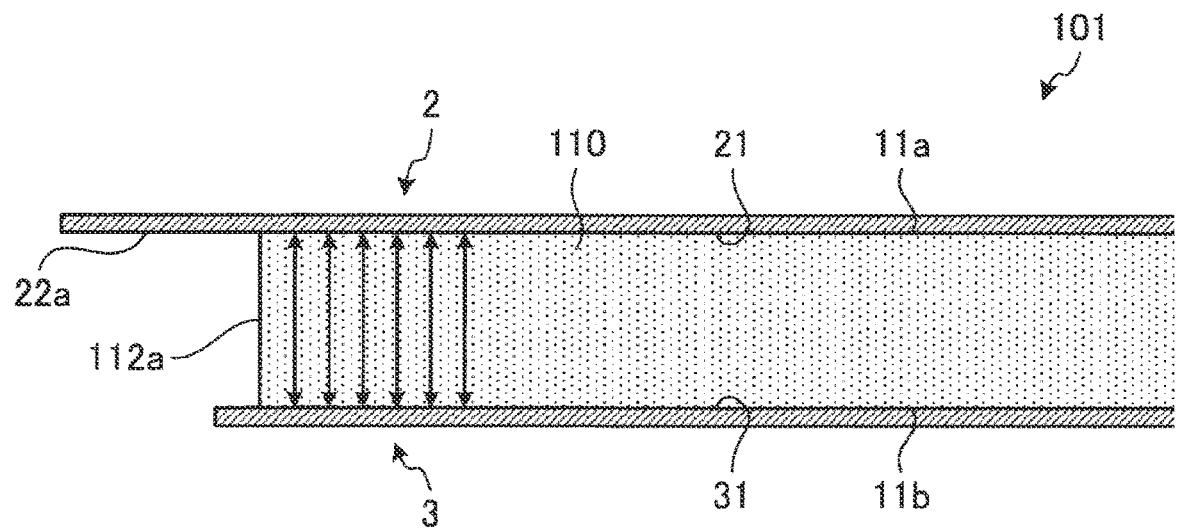
FIGS. 9-10 are diagrams explaining the strength of an adhesive member body when applying an adhesive member of the prior art.

For example, as illustrated in FIG. 9, in the adhesive member 101 of the prior art, an end face 112a oriented in the longitudinal direction of an adhesive member body 110 is formed at right angles relative to adhesive faces 11a and 11b of the adhesive member body 110. Therefore, the strength of the adhesive member body 110 (the strength against force which works in a thickness direction of the adhesive member body 110) becomes constant in the vicinity of the end face 112a of the adhesive member body 110.

Figure 10:
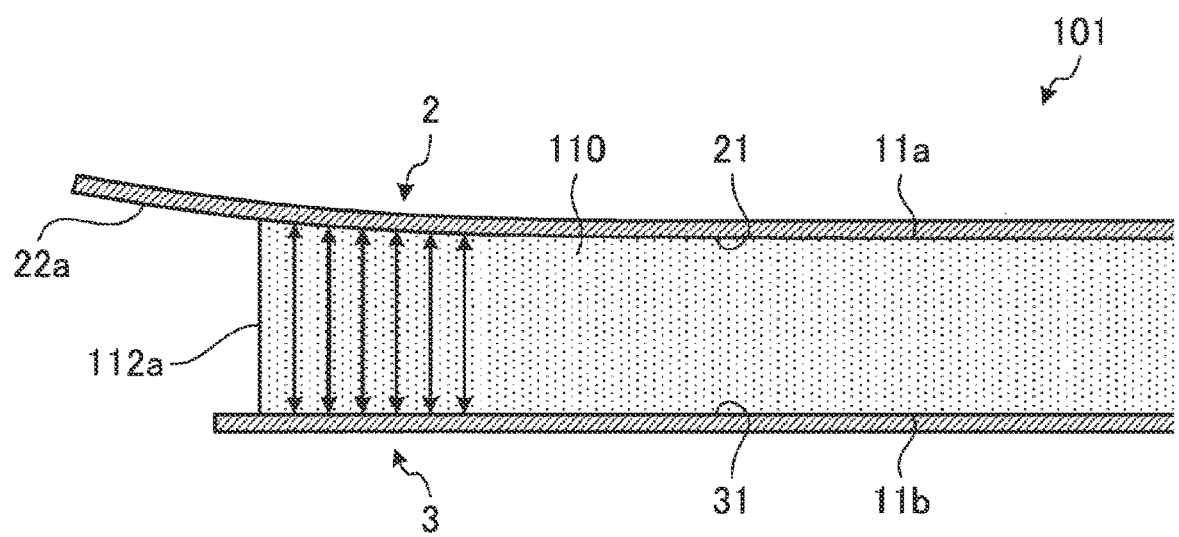

Accordingly, as illustrated in FIG. 10, in the adhesive member 101 of the prior art, which one is released in a first release element 2 and a second release element 3, in other words, which one the adhesive member body 110 follows after in the first release element 2 and the second release element 3 is not known when the operator has lifted up a projection part 22a and it is difficult to release the first release element 2 or the second release element 3 just as the operator intended.

Figure 11:
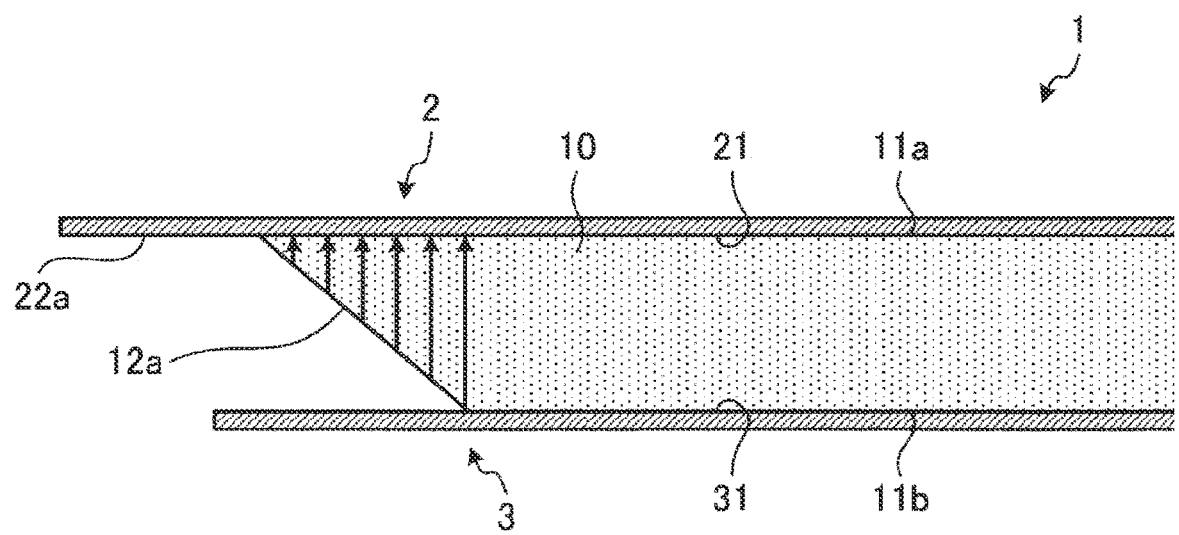
FIGS. 11-12 are diagrams explaining the strength of an adhesive member body when applying the adhesive member of FIG. 4.

On the other hand, as illustrated in FIG. 11, in the adhesive member 1 according to the present embodiment, the end face 12a oriented in the longitudinal direction of the adhesive member body 10 is inclined at angles other than right angles relative to the adhesive faces 11a and 11b of the adhesive member body 10. Therefore, the strength of the adhesive member body 10 (the strength against the force which works in the thickness direction of the adhesive member body 10) does not become constant in the vicinity of the end face 12a of the adhesive member body 10. That is, the strength on the acute angle θ1 side becomes lower and the strength on the obtuse angle θ2 side becomes higher in the vicinity of the end face 12a of the adhesive member body 10.

Figure 12:
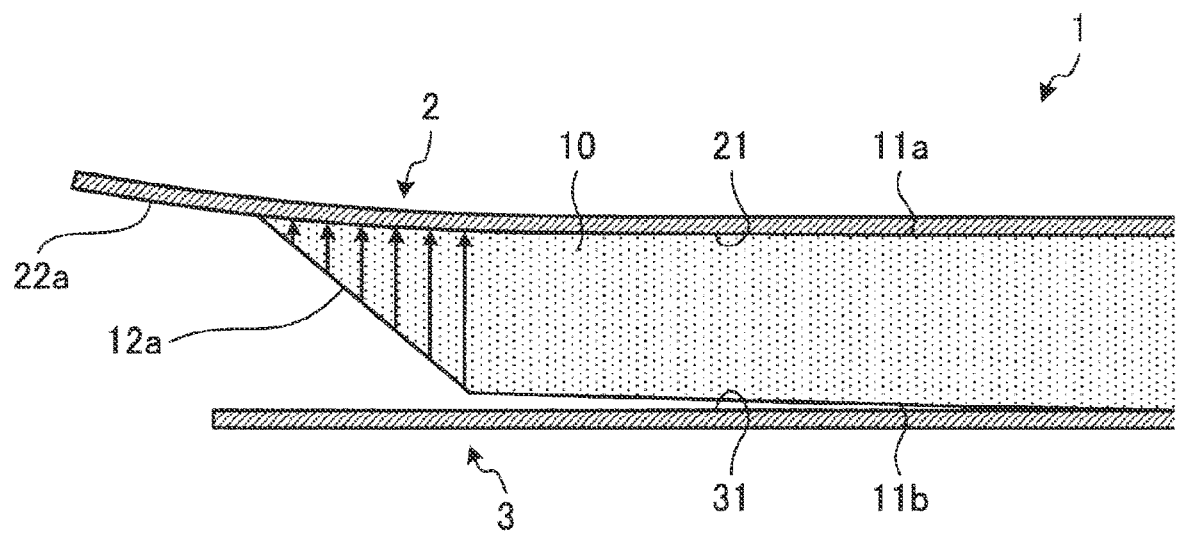

Accordingly, as illustrated in FIG. 12, in the adhesive member 1 according to the embodiment of the present invention, when the operator has lifted up the projection part 22a, the acute angle θ1 side of the adhesive member body 10 is deformed earlier than the obtuse angle θ2 side and thereby a close contact state of the adhered face 21 of the first release element 2 with the adhesive face 11a of the adhesive member body 10 is maintained. Then, also as illustrated in FIG. 12, the adhesive member body 10 follows after the first release element 2 and the second release element 3 is released from the adhesive member body 10.

As described above, in the adhesive member 1 according to the present embodiment, the two facing end faces 12a and 12b of the adhesive member body 10 are included at the angles other than right angles respectively relative to the adhesive faces 11a and 11b and thereby it is possible to change the strength in the vicinity of each of the end faces 12a and 12b of the adhesive member body 10. Accordingly, it becomes possible to release the first release element 2 and the second release element 3 which are respectively provided on the adhesive faces 11a and 11b of the adhesive member body 10 with ease and just as the operator intended.

In addition, also re-sticking of the adhesive member 1 is performed with ease and therefore also re-workability is improved.

As mentioned above, although the adhesive member according to the embodiment of the present invention and the electronic device using the adhesive member have been specifically described on the basis of modes for carrying out the present invention, the gist of the present invention is not limited to these descriptions and shall be widely construed on the basis of description of the scope of patent claims. In addition, it goes without saying that also various modifications, alterations and so forth which have been made on the basis of these descriptions are included in the gist of the present invention.

For example, although in FIGS. 1-2, the laptop PC has been illustrated as the electronic device 5 to which the adhesive member 1 is applicable, the adhesive member 1 may be arranged on the surface of the internal unit heat radiation from which is requested also in the other electronic devices 5 such as tablet type PCs, smartphones, cell phones and so forth.

In addition, although in FIGS. 1-2, the example that the adhesive member body 10 of the adhesive member 1 has been arranged on the surface of the antenna 56 has been described, the adhesive member body 10 may be arranged on the surface of the internal unit heat radiation from which is requested in the electronic device 5.

In addition, although in the adhesive member 1 according to the embodiment of the present invention, the thermal rubber for heat radiation has been supposed as the material of the adhesive member body 10, the adhesive member body 10 may be configured by using, for example, a shock absorption gel used in the internal unit of the electronic device 5, a double-sided tape which is made of a foam material and so forth.

In addition, although in the adhesive member 1 according to the embodiment of the present invention, the two end faces 12a and 12b oriented in the longitudinal direction of the adhesive member body 10 have been inclined at the angles other than right angles and the two end faces 13a and 13b oriented in the transverse direction of the adhesive member body 10 have been formed at the right angles, the end faces 12a and 12b may be formed at the right angles and the end faces 13a and 13b may be inclined at angles other than the right angles inversely. In this case, the first release element 2 and the second release element 3 are formed so as to project respectively from the end faces 13a and 13b of the adhesive member body 10 in the transverse direction of the adhesive member body 10.

In addition, although in the adhesive member 1 according to the embodiment of the present invention, the section of the adhesive member body 10 has been formed into the shape of the parallelogram, the section may have other shapes (other than a trapezoid) as long as the end faces 12a and 12b are configured to form the acute angle θ1 and the obtuse angle θ2 respectively together with one of the adhesive faces of the adhesive member body 10 (the adhesive face 11a or the adhesive face 11b).

As has been described, the present invention provides an improved adhesive member capable of allowing an adhesive body to be applied onto an intended surface.

While the invention has been particularly shown and described with reference to a preferred embodiment, it will be understood by those skilled in the art that various changes in form and detail may be made therein without departing from the spirit and scope of the invention.

What is claimed is:

1. An adhesive member comprising:
a first release element;
a second release element, wherein said second release element is made of identical material as said first release element; and
an adhesive body having a first adhesive surface and a second adhesive surface, wherein said first release element is removably attached to sad first adhesive surface, and said second release element is removably attached to said second adhesive surface, wherein sad adhesive body includes
a first end face forming an acute angle with said first release element and an obtuse angle with said second release element; and
a second end face forming an obtuse angle with said first release element and an acute angle with said second release element
in order to allow easy removal of said first and second release elements from said adhesive body, wherein said first and second release elements are to be discarded after removal from said adhesive body.

2. The adhesive member of claim 1, wherein said first and second release elements are made of resinous film.

3. The adhesive member of claim 1, wherein said first and second release elements are made of paper.

4. The adhesive member of claim 1, wherein said adhesive body is made of thermal rubber for heat dissipation.

5. The adhesive member of claim 4, wherein said adhesive body is made of a conductive silicon resin.

6. The adhesive member of claim 1, wherein the forces for removing said first and second release elements from said adhesive body are substantially identical.

7. The adhesive member of claim 1, wherein said first and second release elements are made of one type of material.

8. An electronic device comprising:
a first chassis having a keyboard; and
a second chassis connected to said first chassis, wherein said second chassis includes a display and an antenna;
an adhesive body includes a first adhesive surface attached to said antenna and a second adhesive surface attached to said second chassis, wherein said adhesive body includes
a first end face forming an acute angle with said antenna and an obtuse angle with said second chassis; and
a second end face forming an obtuse angle with said antenna and an acute angle with said second chassis.

9. The electronic device of claim 8, wherein said adhesive body is made of thermal rubber for heat dissipation.

10. The electronic device of claim 9, wherein said adhesive body is made of a conductive silicon resin.

* * * * *